(12) United States Patent
Samuel

(10) Patent No.: US 9,122,547 B1
(45) Date of Patent: Sep. 1, 2015

(54) EMBEDDING A GUEST MODULE WITHIN AN EMBEDDER MODULE

(71) Applicant: Google Inc., Mountain View, CA (US)

(72) Inventor: Fady Samuel, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/292,757

(22) Filed: May 30, 2014

(51) Int. Cl.
*G06F 3/00* (2006.01)
*G06F 9/54* (2006.01)
*G06F 9/46* (2006.01)
*G06Q 10/10* (2012.01)

(52) U.S. Cl.
CPC .............. *G06F 9/542* (2013.01); *G06F 9/468* (2013.01); *G06Q 10/10* (2013.01)

(58) Field of Classification Search
CPC .................................. G06F 9/54; G06Q 10/10
USPC .................................. 719/318, 310; 715/743
See application file for complete search history.

(56) References Cited

U.S. PATENT DOCUMENTS

| | | | | |
|---|---|---|---|---|
| 8,200,962 | B1* | 6/2012 | Boodman et al. | 713/161 |
| 8,209,377 | B2* | 6/2012 | Minamida | 709/203 |
| 8,676,973 | B2* | 3/2014 | Isaacson | 709/225 |
| 8,769,551 | B2* | 7/2014 | Lapuyade | 719/318 |
| 2003/0051031 | A1* | 3/2003 | Streble | 709/224 |
| 2004/0078424 | A1* | 4/2004 | Yairi et al. | 709/203 |
| 2008/0137819 | A1* | 6/2008 | Temov | 379/88.17 |
| 2010/0211596 | A1* | 8/2010 | Tang | 707/769 |
| 2012/0284694 | A1* | 11/2012 | Waugh et al. | 717/122 |
| 2013/0054672 | A1* | 2/2013 | Stilling et al. | 709/202 |

OTHER PUBLICATIONS

Chen Ding, Centralized Content-Based Web Filtering and Blocking: How Far Can It go?, Chen Ding.*

* cited by examiner

*Primary Examiner* — Lechi Truong
(74) *Attorney, Agent, or Firm* — McDermott Will & Emery LLP

(57) ABSTRACT

Systems and methods embedding a guest module within an embedder module are disclosed. According to some aspects, an embedder module is executed at a computer. A request to access a guest module is received via the embedder module. The request comprises a tag in a programming language. The tag identifies the guest module. An event is provided, using information associated with the tag, to an executing instance of the guest module responsive to the request to access the guest module. Processing of the event at the executing instance of the guest module is signaled.

16 Claims, 10 Drawing Sheets

```
1.     // Portion of code of Embedder Module
2.
3.
4.     var object = document.createElement('object');
5.     object.type = 'application/x-BROWSER-app;
6.
7.     function onReady(success) {
8.        if (!success) {
9.           return;
10.       }
11.    object.postUpdate({
12.       message: 'I am using FIRST-SOCIAL-NETWORK as a service in another module',
13.       SOCIAL-GROUPS: ['Friends', 'Family', 'Coworkers']
  });
}
14.
15.    object.connect({
16.       src: 'BROWSER-app://FIRST-SOCIAL-NETWORK.com?view=widget&apiversion=2',
17.       params: {
18.          'param1': 'foo',
19.          'param2': 'bar'
20.       }
}, onReady);
21.
22.    object.addEventListener('magic', function(e) {
23.       // Prints out abracadabra.
24.       window.console.log('msg' + e.msg);
});
25.
26.    // To embed the FIRST-SOCIAL-NETWORK module as a PREFER button.
27.    document.body.appendChild(object);
28.
```

FIG. 1A

```
29.    // Portion of code of FIRST-SOCIAL-NETWORK Guest Module
30.
31.
32.
33.    function EmbeddingAPIV1() {}
34.
35.    function EmbeddingAPIV2() {}
36.
37.    EmbeddingAPIV2.prototype.postStatus = function(message,
SOCIAL-GROUPS) {
38.       // Do FIRST-SOCIAL-NETWORK magic here.
39.       embedderChannel.dispatchEvent({
40.          name: 'magic',
41.          params: {
42.             msg: 'abracadabra'
43.          }
44.       });
45.    };
46.
47.    function GetEmbeddingAPI(version) {
48.       if (version < 2)
49.          return new EmbeddingAPIV1();
50.        return new EmbeddingAPIV2(); }
51.
52.
53.    BROWSER.app.runtime.onModEmbeddingRequest.addListener(
function(request) {
54.
55.       window.console.log('param 1: ' + request.params.param1);
56.       window.console.log('param 2: ' + request.params.param2);
57.       // e.origin
58.       request.allow('foo.html',
GetEmbeddingAPI(request.url.params['apiversion'])); });
```

FIG. 1B

```
<object type="application/x-BROWSER-app" src="BROWSER-app://
FIRST-SOCIAL-NETWORK.com?view=widget&apiversion=2" param1="foo"
param2="bar"></object>
```

FIG. 2A

```
<object type="application/x-BROWSER-app" src="BROWSER-app://
BROWSER.DEVELOPER.com/BROWSER-STORE?view=widget"
interfaces="imageEditing, imageCapture"></object>
```

FIG. 2B

```
// In the embedder module's page.

var object = document.querrySelector('object');
object.port.addListener(function(msg) {
   // <object> can listen for unstructured messages from the
   //embedded module.
});

var Console = function () {
  this.name = 'console';
};

Console.prototype.log=function(msg) {
  window.console.log(msg);
};

var Tabs = function () {
  this.name= 'tabs';
};

Tabs.prototype.executeScript = function(remoteCode, callback) {
  webview.executeScript({code: remoteCode}, callback);
};

object.connect({
src: 'BROWSER-app://FIRST-SOCIAL-
NETWORK.com?view=widget&apiversion=2',
api: [new Console(), new Tabs()]},
function (success) {
    //Guest module's API is ready to access.
    object.api.conole.log('Foobar');
});
```

FIG. 7A

```
// In the embedded module's background page.

var Console= function () { this.name= 'console'; };
Console.prototype.log= function(msg) {
    this.frame.console.log(msg);
};

var Tabs = function () { this.name = 'tabs'; };
Tabs.prototype.executeScript=
    function(remoteCode, callback) {
    this.frame.document.querySelector( 'webview').
        executeScript ({code: remoteCode }, callback);
};

BROWSER.app.runtime.onAppEmbeddingRequest.addListener(
    function(request) {
  var width= 1024;
  var height= 768;
  window.console.log(request.appId);
  request.allow ('app.html', {
      bounds: {
          width: width,
          height: height,
      },
  }, [new Console(), new Tabs () ]};
});
```

FIG. 7B

```
// In the embedded module's 'app.html' page.

onload= function () {
    embedder.api.tabs.executeScript(
      'document.body.backgroundColor= "red"',
      function(results) {
      //outputs ["red"].
      window.console.log(results);
    }
  }
```

FIG. 7C

EMBEDDING A GUEST MODULE WITHIN AN EMBEDDER MODULE

CROSS REFERENCE TO RELATED APPLICATION

This application is related to U.S. patent application Ser. No. 14/292,755 entitled "EMBEDDING A USER INTERFACE OF A GUEST MODULE WITHIN A USER INTERFACE OF AN EMBEDDER MODULE,", filed concurrently herewith, the entire disclosure of which is incorporated herein by reference.

BACKGROUND

The subject technology is generally directed to allowing one module to access information or visual data associated with another module. A module may include an application, a widget, or a service executing on a computing device.

In some cases, a user of an embedder application may wish to use a guest application, different from the embedder application, within the embedder application. For example, a user reading an article in a newspaper application may wish to indicate that he/she "prefers" or "likes" the article via a social networking application. In order to do so, the user may need to log into the social networking application within the newspaper application or provide, to the newspaper application, a cookie indicating that the user is logged into the social networking application (e.g., in a web browser). This may not be desirable if the user does not trust the newspaper application with his/her social networking application information or credentials but, nevertheless, wishes to indicate that he/she "prefers" the newspaper's content via the social networking application. As the foregoing illustrates, a new approach for embedding a first application within a second application may be desirable.

SUMMARY

According to some aspects, the subject technology relates to a method. The method includes executing an embedder module at a computer. The method includes receiving, via the embedder module, a request to access a guest module, wherein the request comprises a tag in a programming language, and wherein the tag identifies the guest module. The method includes providing, using information associated with the tag, an event to an executing instance of the guest module responsive to the request to access the guest module. The method includes signaling for processing of the event at the executing instance of the guest module.

According to some aspects, the subject technology relates to a non-transitory computer-readable medium storing instructions. The instructions include code for executing an embedder module at a computer. The instructions include code for receiving, via the embedder module, a request to access a guest module, wherein the request comprises a tag in a programming language, and wherein the tag identifies the guest module. The instructions include code for providing, using information associated with the tag, an event to an executing instance of the guest module responsive to the request to access the guest module, wherein the executing instance of the guest module executes at a computing device different from the computer, and wherein the computing device and the computer are associated with a common user account. The instructions include code for signaling for processing of the event at the executing instance of the guest module.

According to some aspects, the subject technology relates to a system. The system includes one or more processors and a memory storing instructions. The instructions include code for executing an embedder module. The instructions include code for receiving, via the embedder module, a request to access a guest module, wherein the request comprises a tag in a programming language, wherein the tag identifies the guest module, wherein the guest module has multiple versions, and wherein the tag specifies a version of the guest module to be accessed. The instructions include code for providing, using information associated with the tag, an event to an executing instance of the guest module responsive to the request to access the guest module. The instructions include code for signaling for processing of the event at the executing instance of the guest module.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

FIG. 1A illustrates an example portion of code of an embedder module for embedding a guest module within the embedder module.

FIG. 1B illustrates an example portion of code of a guest module for embedding the guest module within an embedder module.

FIG. 2A illustrates an example portion of code for embedding a guest module within an embedder module with no communication between the guest module and the embedder module.

FIG. 2B illustrates an example portion of code for embedding a guest module within an embedder module with a set of interfaces for communication between the guest module and the embedder module.

FIG. 7A illustrates an example portion of code of an embedder module for exposing application programming interface(s) to a guest module.

FIG. 7B illustrates an example portion of code of a background page of a guest module for exposing application programming interfaces(s) of an embedder module to a guest module.

FIG. 7C illustrates an example portion of code of an app.html page of a guest module for exposing application programming interfaces(s) of an embedder module to a guest module.

DETAILED DESCRIPTION

Figure 3:
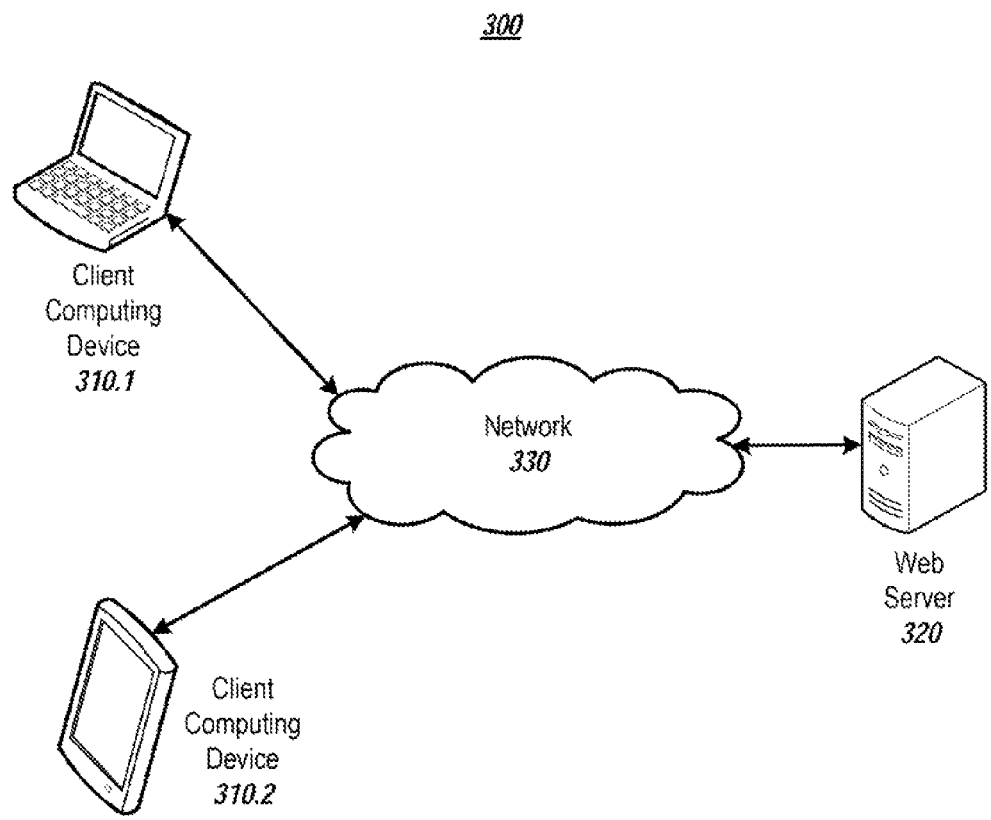
FIG. 3 illustrates an example network system for embedding a guest module within an embedder module.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology provides, among other things, techniques (e.g., an application programming interface (API)) for embedding a guest module within an embedder module. As used herein, a module may include an application, a widget, or a service (e.g., a component of an application). According to some implementations, an application may function as a widget or a service. In other words, an application may be presented as a standalone interface to the user (e.g., as a traditional application), as a frame within another application having a different visual interface (e.g., widget), or the application may provide data to another application (e.g., an embedder module/application) without providing a visual interface (e.g., service). As used herein, a traditional application may be an application executing on a client computing device independently of a web browser, a browser application executing within the web browser, or a packaged application downloaded and managed via the web browser but not executing within the web browser.

A packaged application may be browser application that may be bundled into a .crx file and may use browser extension features. A packaged application may be built similarly to an extension. However, in some cases, a packaged application may not include a browser action or page action. Instead, a packaged application includes at least one Hypertext Markup Language (HTML) file within its .crx file that provides the packaged application's user interface. A packaged application may be a type of installable browser application, in other words, a browser application that may be installed in a browser. The other type of installable browser application is a hosted application, which is an ordinary browser application with a bit of additional metadata.

A packaged application may be preferable to a hosted application in some circumstances, for example, if a service does not need to be run to host the application, the application needs to work offline, or tighter integration with the browser, for example, using extension application programming interface(s), is desirable.

In some implementations, a packaged application may occupy a rectangle within another application or within a browser window. The packaged application may include a width field and a height field specifying the width and height (e.g., in pixels or another unit of measurement) to be occupied by the packaged application within the other application or the browser window.

In some cases, a tag, for example, the <object> tag in HTML or the <appview> tag in HTML, may be used to enable such embeddings. The <object> tag may serve as a proxy by which the guest module may provide data to the embedder module or be visually embedded within a visual interface of the embedder module. The embedder module may use the <object> tag to request interface(s), for example, a data sharing interface or a visual interface, from the guest application.

In one example, the guest module is a social networking application and the embedder module is a newspaper application. Using information associated with the social networking application, the newspaper application may provide a PREFER button for indicating a preference for content in the social networking application. The newspaper application may receive user identity information from the social networking application so that users of the social networking application can log into their accounts in the newspaper application without having to remember additional usernames or passwords. The newspaper application may allow the user to comment on articles in the newspaper and have the user's name and photograph from the social networking application appear adjacent to the user's comments. In one implementation, the comments may also be posted to the social networking service or the newspaper application may indicate, in the user's feed of social networking service, that the user has read articles in the newspaper application.

The code of the newspaper application may include an <object> tag identifying the social networking application. Upon receiving a request to access the social networking application, the newspaper application may provide, using information associated with the <object> tag, an event to an executing instance of the social networking application (e.g., in another window or tab of the same computing device or at a different computing device). The event may be processed at the executing instance of the social networking application.

The user interface of the newspaper application may present a PREFER button associated with the social networking application. Upon selection (e.g., via a mouse or a touch-screen) of the PREFER button, the newspaper application may signal for the executing instance of the social networking application to provide a service responsive to the selection of the PREFER button. For example, the executing instance of the social networking application may post, to other users of the social networking application, a post indicating that the user of the executing instance of the social networking application prefers the content of the newspaper application.

Advantageously, in some implementations, the newspaper application may not be provided with access to all or a portion of the user's information stored by the social networking application. As a result, the user may have access to the social networking application within the newspaper application, where the user does not trust the newspaper application to have access to the user's information stored by the social networking application.

Other applications, widgets or services, different from those mentioned above, may function as the guest module or the embedder module. For instance, the embedder module may be an application for playing the game checkers, and the guest module may be an application store of a web browser.

FIG. 1A illustrates an example portion of code of an embedder module for embedding a guest module within the embedder module. In the example of FIG. 1A, the embedder module is an embedder application, which is using a guest social networking application (FIRST-SOCIAL-NETWORK) as a widget.

As shown in FIG. 1A, an object tag, which may be used for accessing a guest module, is defined in lines 4-5. Using the code of FIG. 1A, the embedder application may interact with the guest FIRST-SOCIAL-NETWORK application in different ways. For example, the embedder application may post a status update for the user in FIRST-SOCIAL-NETWORK (lines 10-13), connect to a user's feed in FIRST-SOCIAL-NETWORK (lines 15-20), listen for event(s) in the user's feed (lines 22-24), or provide a PREFER button for indicating a preference for content via FIRST-SOCIAL-NETWORK (lines 26-27). The code in FIG. 1A is provided as an example only, and different code may be used to provide the functionality described above or other functionality.

FIG. 1B illustrates an example portion of code of a guest module for embedding the guest module within an embedder module. The code illustrated in FIG. 1B is the code of the guest social networking application (FIRST-SOCIAL-NETWORK) that allows FIRST-SOCIAL-NETWORK to be embedded into the embedder application of FIG. 1A. In some cases, the code of FIG. 1A and the code of FIG. 1B may be used together.

As shown in FIG. 1B, the guest social networking application FIRST-SOCIAL-NETWORK includes code for interfacing with the embedder module. The illustrated code of FIRST-SOCIAL-NETWORK includes code for providing embedding APIs (lines 33-35). The illustrated code includes code for posting, using the embedder module, a status to FIRST-SOCIAL-NETWORK (lines 37-45). The illustrated code includes code for determining an API version to provide to the embedder module (lines 47-50). The illustrated code includes code for providing a listener for events in FIRST-SOCIAL-NETWORK to the embedder module (lines 52-58).

FIG. 2A illustrates an example portion of code for embedding a guest module within an embedder module with no communication between the guest module and the embedder module. The code of FIG. 2A matches the behavior of other Internet elements (e.g., webpages embedding information from other Internet sources using HTML), thereby allowing a developer to embed a guest module within an embedder module with minimal effort on the developer's part and without requiring the developer to familiarize him/herself with a new syntax. A connection between the embedder module and the guest module may be established using the syntax of the HTML <object> tag, as illustrated in FIG. 2A.

The code of FIG. 2A allows embedding of the FIRST-SOCIAL-NETWORK module within an embedder module that includes this code. The code of FIG. 2A, when executed, implements similar functionality to the code at lines 4-5 and 15-20 of FIG. 1A. However, in the example of FIG. 2A, the FIRST-SOCIAL-NETWORK module does not verify that the connection was successful, and the embedder module does not receive or process a verification that the connection was successful. Also, the FIRST-SOCIAL-NETWORK module does not indicate which API(s) or interface(s) of FIRST-SOCIAL-NETWORK are exposed to the embedder module, and which are not.

FIG. 2B illustrates an example portion of code for embedding a guest module within an embedder module with a set of interfaces for communication between the guest module and the embedder module. As shown in FIG. 2B, the embedder module may request interface(s) from the guest module for accessing functionality or information in the guest module. Specifically, the code in FIG. 2B requests the "imageEditing" and "imageCapture" interfaces from the guest module (BROWSER-STORE). However, other interfaces or different interfaces may also be requested using the subject technology.

The set of interfaces that are provided from the guest module to the embedder module, from which the "imageEditing" and "imageCapture" interfaces were selected in FIG. 2B, may be unique for each guest module, requiring a developer of the embedder module to be familiar with the guest module. Alternatively, a predetermined set of interfaces (including, for example, "imageEditing" and "imageCapture") may be pre-programmed in all guest module for interacting with the subject technology. As a result, developer of the embedder module may not need to be familiar with the guest module. Furthermore, one guest module may be easily replaced with another, with minimal modifications to code, if the need arises.

In some cases, an interface broker module (for example, an application store) may be provided. The interface broker can search for module(s) that implement the interface(s) requested by a developer, and the developer may select the guest module(s) to embed in the embedder module that the developer is developing. For instance, as shown in FIG. 2B, the BROWSER-STORE guest module is being embedded, into the embedder module, with a set of requested interfaces ("imageEditing" and "imageCapture"). The BROWSER-STORE module may search for other module(s), hosted by the BROWSER-STORE module, that support the requested interfaces. The developer or an end-user may be presented with an interface for selecting a hosted module that supports the requested interface(s). Once the hosted module is selected, the hosted module may be embedded in the embedder module.

The <object> tag, as illustrated, for example, in FIGS. 2A-2B, may represent one end of a two-way communication channel between modules. In some cases, the two modules may reside on the same client computing devices. In other cases, the two modules may reside on different client computing devices associated with a common user account and connected to one another via a network. The code written by the module developer for either connection (same client computing device or different client computing devices) may be identical. In other words, the module developer may not need to know whether the embedder module and the guest module reside on the same client computing device or on associated client computing devices. Various approaches for associating two client computing devices are discussed in greater detail below.

The <object> tag may be the abstraction that is exposed to module developers once the connection between the guest module and the embedder module is established. In some cases, a distributed naming technique may be used to identify specific modules on specific devices. An example format of a module uniform resource identifier (URI) technique may be as follows: BROWSER-app://origin/path?device=deviceId.

In the above URI technique, origin/path defines a path to a web version of the module. In some cases, computer(s) implementing the subject technology may verify that the embedder module has permission to access the specified path. A cross-device API may generate the deviceId, which is included in the URI. A lack of a device parameter in the URI may indicate a guest module at the same computing device as the embedder module. Lines 15-20 of FIG. 1A demonstrate how a developer of an embedder module using JavaScript may programmatically establish a connection with the FIRST-SOCIAL-NETWORK guest module and provide parameters to the FIRST-SOCIAL-NETWORK guest module.

An <object> tag, as described herein, may or may not be attached to a document object model (DOM) of the embedder module. If the <object> tag is not attached, the <object> tag may act as a service object. In other words, data may be passed back and forth between the embedder module and the guest module. However, no visual presentation associated with the guest module may be made within a visual user interface of the embedder module.

If the <object> tag is attached to the DOM of the embedder module, the guest module may be informed of the attachment via an event. The guest module may respond by requesting a new module frame to be embedded in the user interface of the embedder module. The embedder module may ignore or modify the size of the frame requested by the guest module. Alternatively, the embedder module may provide a frame of the requested size.

Which API(s) or which API version(s) of the guest module are exposed or which user interface(s) of the guest module are presented to the embedder module may be encoded as part of the URI. In some cases, the embedder module may be programmed to interact with an earlier API version of the guest module, and not with the latest API version of the guest module. This may be indicated in the URI, for example, by placing the text (apiversion=2 in the URI. This is illustrated, for example, in line 16 of FIG. 1A. The code view=widget of line 16 of FIG. 1A indicates that the embedder module is requesting a visual interface of the guest module.

When the guest module and the embedder module are connected to one another, the guest module may expose an embedding API to the embedder module as illustrated, for example, in lines 31-58 of FIG. 1B. In some examples, a JavaScript object is passed between the guest module and the embedder module. The embedder module may attach bindings to the JavaScript object. A broker module, facilitating the interaction between the embedder module and the guest module, may be responsible for serializing (e.g., ensuring a processing order for) calls to processes associated with the JavaScript object. The guest module may provide one or more fields to the embedder module, as illustrated, for example, in line 39 of FIG. 1B. The embedder module may dispatch events using the provided fields using the <object> tag, as shown, for example, in line 22 of FIG. 1A.

FIG. 3 illustrates an example network system 300 for embedding a guest module within an embedder module. As shown, the system 300 includes client computing devices 310.1 and 310.2 connected to one another and to a web server 320 via a network 330. The network 330 may include any network(s), for example, the Internet, an intranet, a cellular network, a local area network, a wide area network, a wired network, a wireless network, a virtual private network (VPN), etc. Each client computing device 310.1-2 may be any computing device, for example, a laptop computer, a desktop computer, a tablet computer, a mobile phone, a personal digital assistant (PDA), an electronic music player, a smart watch, a television coupled with one or more processors and a memory, etc. As described in greater detail below, each client computing device 310.1-2 may include an embedder module or a guest module implementing the functionalities described herein. Furthermore, the client computing devices 310.1-2 may be associated with a common user account, which may be a web browser user account or an operating system user account. Alternatively, the first computing device and the second computing device may provide other indicia that they are both associated with the same user, for example, by being logged into a common email account or a common WiFi network. The web server 320 may be a server that stores web-based content accessible at the client computing device(s) 310.1-2 via the network 330.

While two client computing devices 310.1-2 are illustrated in FIG. 3, the subject technology may be implemented with any number of client computing devices. Similarly, while a single web server 320 is illustrated in FIG. 3, the subject technology may be implemented with any number of web servers.

Figure 4:
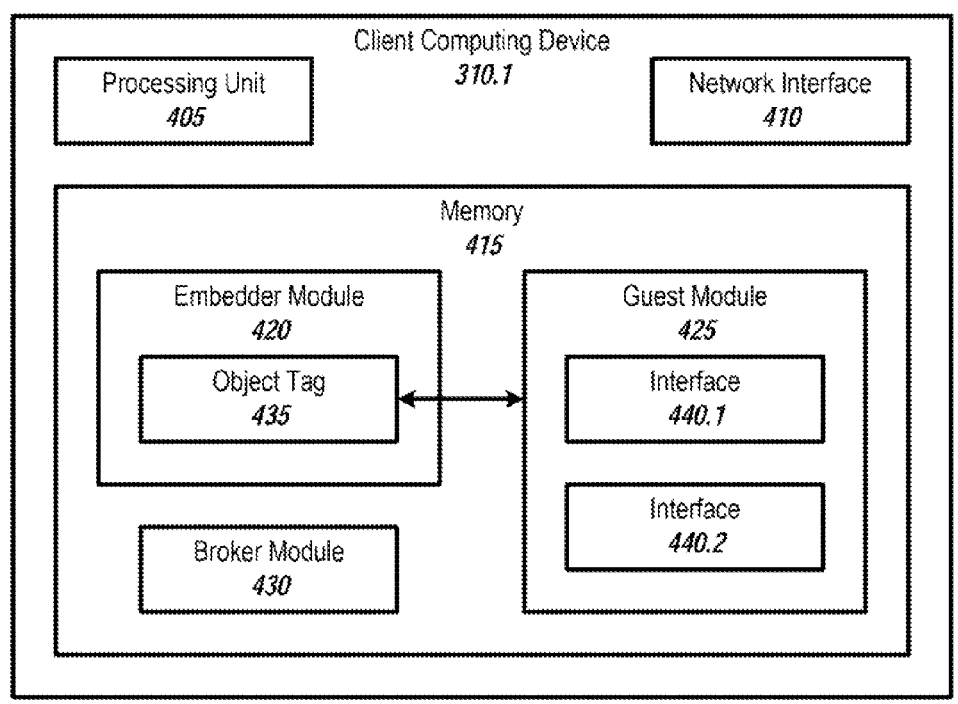
FIG. 4 illustrates an example of one of the client computing devices of FIG. 3.

FIG. 4 illustrates an example of the client computing device 310.1 of FIG. 3. As shown, the client computing device 310.1 includes a processing unit 405, a network interface 410, and a memory 415. The processing unit 405 includes one or more processors. The processing unit 405 may include a central processing unit (CPU), a graphics processing unit (GPU), or any other processing unit. The processing unit 405 executes computer instructions that are stored in a computer-readable medium, for example, the memory 415. The network interface 410 allows the client computing device 310.1 to transmit and receive data in a network, for example, the network 330 of FIG. 3. The memory 415 stores data and/or instructions. The memory 415 may be one or more of a cache unit, a storage unit, an internal memory unit, or an external memory unit. As illustrated, the memory 415 includes an embedder module 420, a guest module 425, and a broker module 430.

Figure 5:
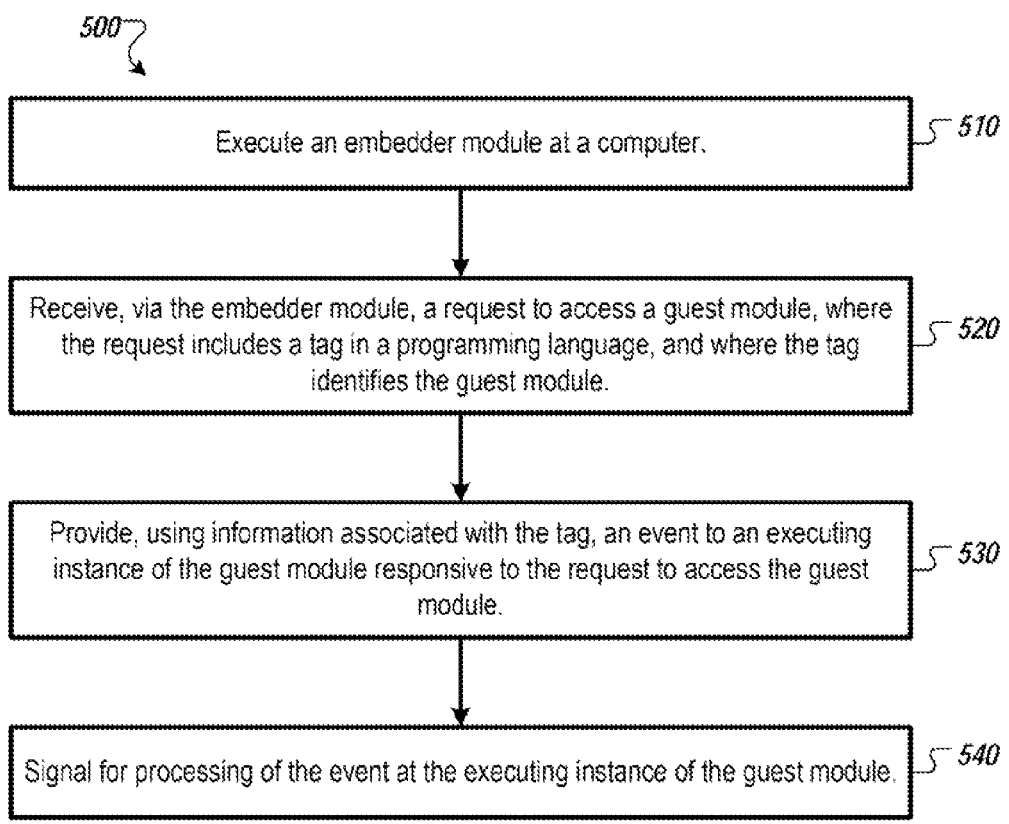
FIG. 5 illustrates an example process by which an embedder module may provide an event to a guest module.
Figure 6:
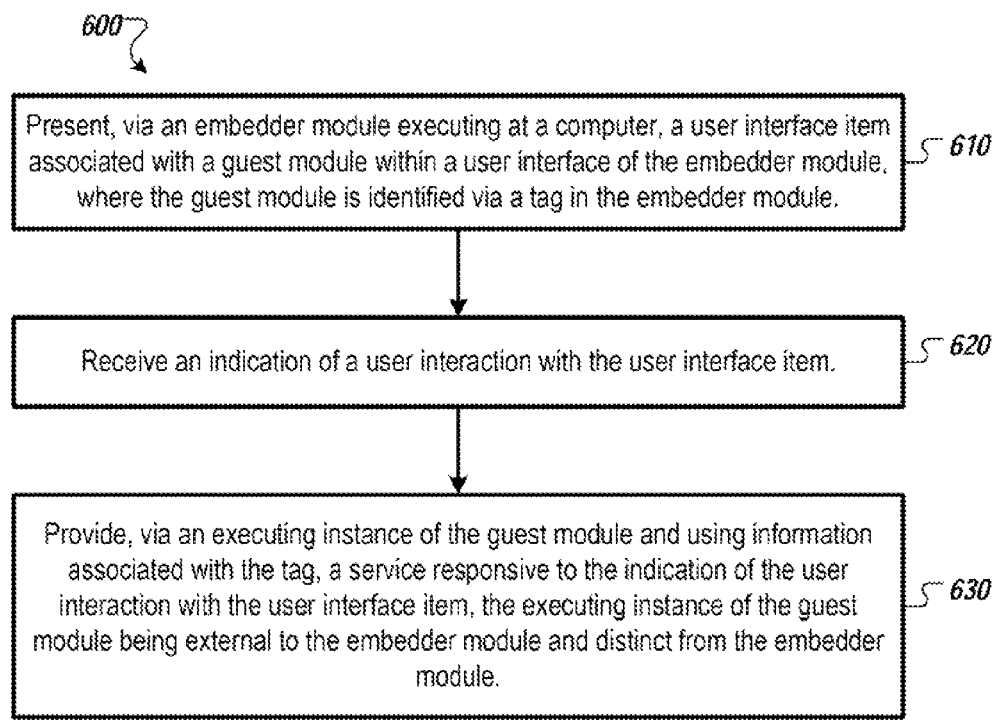
FIG. 6 illustrates an example process by which an embedder module may provide a user interface item associated with a guest module.

The embedder module 420 may embed the guest module 425, for example, using the techniques described herein in conjunction with FIG. 5 and FIG. 6. As shown, the embedder module includes an object tag 435 that identifies the guest module 425. The object tag 435 may be a HTML object tag or a similar tag in any other programming language. Examples of code corresponding to the object tag 435 are illustrated in FIG. 1A, FIG. 2A, and FIG. 2B. However, other code may also be used to implement the functionality of the object tag 435.

The guest module 425 may be embedded within the embedder module 420 using the techniques described herein. The guest module 425 may provide interface(s) 440.1-2 for accessing, via the embedder module 420, information, visual data, or other functionality of the guest module 425. While two interfaces 440.1-2 are illustrated herein, the subject technology may be implemented with any number of interfaces. The interface(s) 440.1-2 may include APIs or other interfaces. For example, the interface(s) 440.1-2 may be an "imageEditing" interface or an "imageCapture" interface, as shown in FIG. 2B. In some examples, the guest module 425 may correspond to a social networking application and may provide interface(s) 440.1-2 for identifying a user, providing a PREFER button for indicating a preference for content in the social networking service, presenting a feed of the social networking service, or posting to a stream of the social networking service. In some cases, the guest module 425 may lack interface(s) 440.1-2 or may not provide any interfaces to the embedder module 420 as illustrated, for example, in the code of FIG. 2A.

In some cases, interface(s) 440.1-2 for accessing the guest module 425 may be requested by the embedder module 420 in the object tag 435. The broker module 430 may search the embedder module 420 or sub-modules of the embedder module for interface(s) 440.1-2 implementing the functionality requested through the object tag 435. The broker module 430 may be an application store, for example, an app store of a browser or a mobile device operating system. Alternatively, the broker module 430 may be implemented independently of the application store.

As illustrated in FIG. 4, the embedder module 420 and the guest module 425 reside on the same client computing device 310.1. However, in some cases, the embedder module 420 and the guest module 425 may reside on different client computing devices. A connection may be established across two client computing devices 310.1 and 310.2 that are associated with a same user account (e.g., email account, browser account, operating system developer account, etc.). The <object> tag may serve as a conduit by which modules may communicate across devices. Once a connection with a mobile device is established, the <object> tag may facilitate communication between modules at different computing devices. Using the <object> tag, the guest module 425 may be addressed in the same way regardless of whether it is located at the same computing device as the embedder module 420 or at a different computing device from the embedder module 420. In some cases, a connection between the guest module 425 and the embedder module 420 may fail, for example, due to a network failure or due to an internal failure or error at the client computing device 310.1 or 310.2 hosting the guest module 425 or the embedder module 420. In these circumstances, the <object> tag representing the guest module may provide a disconnect event.

FIG. 5 illustrates an example process 500 by which an embedder module may provide an event to a guest module.

The process 500 begins at step 510, where a computer (e.g., client computing device 310.1) executes an embedder module (e.g., embedder module 420). The embedder module may be a packaged application that is installed via a web browser, is stored externally to the web browser, and has access to extensions of the web browser. Alternatively, the embedder module may be a browser application that is stored within the web browser.

In step 520, the computer receives, via the embedder module, a request to access a guest module (e.g., guest module 425). The request includes a tag (e.g., object tag 435) in a programming language (e.g., HTML). The tag identifies the guest module. In some cases, a visual interface associated with the guest module may be presented within a visual interface of the embedder module. For example, the guest module may correspond to a social networking application, and the visual interface associated with the guest module may be a portion of a feed from the social networking application or a PREFER button for indicating a preference for content via the social networking application. The guest module may be a packaged application that is installed via the web browser, is stored externally to the web browser, and has access to extensions of the web browser. Alternatively, the guest module may be a browser application that is stored within the web browser.

In some cases, multiple versions of the guest module are available, and the tag specifies a version of the guest module to be accessed by the embedder module. Alternatively, the embedder module may provide the request to access the guest module to a broker module. the broker module may then identify the guest module to be accessed by the embedder module. The broker module may be the web browser, an operating system controller, a web browser application store, or an operating system application store.

In step 530, the computer provides, using information associated with the tag, an event to an executing instance of the guest module. The event is provided responsive to the request to access the guest module. The executing instance of the guest module may execute at the computer (e.g., at client computing device 310.1). Alternatively, the executing instance of the guest module may execute at a computing machine (e.g., at client computing device 310.2) different from the computer. The computing machine and the computer may be associated with a common user account. The common user account may be a web browser user account or an operating system user account. Alternatively, the computing machine and the computer may indicate that they area associated with a common user in another way, for example, by being connected to a common WiFi network or being logged in to the same email account.

In step 540, the computer signals for processing of the event at the executing instance of the guest module. For example, the event may be a selection of the PREFER button, and processing the event may be generating a post in the social networking service regarding the user's preference for the content. After step 540, the process 500 ends.

FIG. 6 illustrates an example process 600 by which an embedder module may provide a user interface item associated with a guest module.

The process 600 begins at step 610, where a computer (e.g., client computing device 310.1) presents, via an embedder module (e.g., embedder module 420), a user interface item associated with a guest module (e.g., guest module 425) within a user interface of the embedder module. The user interface item may be, for example, a portion of a feed of a social networking application, where the guest module corresponds to the social networking application. The guest module may be identified via a tag (e.g., object tag 435) in the embedder module.

In step 620, the computer receives an indication of a user interaction with the user interface item. For example, the indication of the user interaction with the user interface item may include the user typing information into the feed of the social networking application.

In step 630, the computer provides, via an executing instance of the guest module and using information associated with the tag, a service responsive to the indication of the user interaction. For example, the service may include posting information within the social networking application and updating stored information about the user within the social networking application. The executing instance of the guest module is external to the embedder module and distinct from the embedder module. After step 630, the process 600 ends.

The executing instance of the guest module may execute at the computer (e.g., at client computing device 310.1). Alternatively, the executing instance of the guest module may execute at a computing machine (e.g., at client computing device 310.2) different from the computer. The computing machine and the computer may be associated with a common user account. The common user account may be a web browser user account or an operating system user account. Alternatively, the computing machine and the computer may indicate that they area associated with a common user in another way, for example, by being connected to a common WiFi network or being logged in to the same email account.

In one implementation, the guest module corresponds to a social network. The user interface item is a PREFER button for indicating a preference for content via the social networking application. The user interaction may include a selection of the PREFER button via a mouse or touchscreen. The service responsive to the indication of the user interaction includes indication a preference for the content via the social networking application.

Advantageously, in some implementations of the subject technology, the guest module may not provide, to the embedder module, access to user credentials associated with the executing instance of the guest module. As a result, a user may access data of the guest module (e.g., social networking data) in an embedder application (e.g., a newspaper application, a video sharing application, a music application, etc.) which the user does not necessarily trust with his/her credentials for accessing the guest module.

Either the embedder module or the guest module may be a packaged application that is installed via a web browser, is stored externally to the web browser, and has access to extensions of the web browser. Either the embedder module or the guest module may be a browser application that is stored within the web browser.

As described above, the guest module may expose its API (s) to the embedder module. However, in some cases, it may be desirable for the embedder module to expose its API(s) to the guest module, for example, to enable bi-directional communication between the guest module and the embedder module or to enable the guest module to receive information from the embedder module (e.g., information about user activity in the embedder module, which may be provided with the user's permission). The embedder module may be able to control which API(s), if any, are exposed to the guest module. Upon being embedded in the embedder module, the guest module may send, to the embedder module, an "on app embedding request" for the embedder module to expose its API(s) to the guest module. The embedder module may allow or deny this request. If the embedder module denies the request, none of the embedder module's APIs will be exposed to the guest module. If the embedder module allows the request, the embedder module may specify which of its API (s) will be exposed to the guest module. For example, the embedder module may have an appview element with a consoles interface and a tabs interface. The embedder module may expose both the tabs interface, but not the console interface, to the guest module.

In this regard, FIG. 7A illustrates an example portion of code of an embedder module for exposing API(s) to a guest module. FIG. 7B illustrates an example portion of code of a background page of a guest module for exposing API(s) of an embedder module to a guest module. FIG. 7C illustrates an example portion of code of an app.html page of a guest module for exposing API(s) of an embedder module to a guest module.

Multiple use cases of the subject technology are possible. Some example use cases are described below.

In one use case, an identity may be tied to a guest module (e.g., a social networking application or an email application). The user may log into the guest module and allow embedder module(s) to have access to the identity of the guest module. Importantly, the embedder module accesses the guest module directly to indicate that the user is logged into the guest module with the user's guest module login identity. The user may, in some implementations, not need to provide his/her guest module login identity directly to the embedder module. Advantageously, the embedder module may have access to the guest module through one or more client computing devices without being able to access the user's account with the guest module at a web server associated with the guest module.

In another use case, a guest module may be visually embedded into a visual interface of an embedder module. The presentation of the guest module within the visual interface of the embedder module may be different from the presentation of the guest module when the guest module is presented as a standalone application. For example, if the guest module is a social networking application, the presentation of the guest module within the visual interface of the embedder module may include a PREFER button, a SHARE button, a photograph of the user to be placed adjacent to comments made by the user in the embedder module (e.g., comments about an article in a newspaper application), or a filtered version of the user's feed in the social networking application. In this use case, the embedder module may access an executing instance of the guest module at a client computing device directly, rather than accessing login credentials or cookies associated with the guest module via a web browser. Thus, the embedder module may have access to the guest module at client computing device(s) without having access to the user's account with the guest module at a web server associated with the guest module.

Advantageously, according to some implementations of the subject technology, an application may not only serve as a visual interface for a user, but also serve as a service (e.g., component) of another application. As a result, the guest application may be used by a developer different from the original developer of the guest application or bundled into an embedder application as a component thereof. In some cases, a web-based platform that provides multiple services (e.g., speech recognition, maps, etc.) may embed, within a title bar of every browser application, a widget that access all or a portion of the multiple services. This may result in increased traffic to and user access of the web-based platform.

Figure 8:
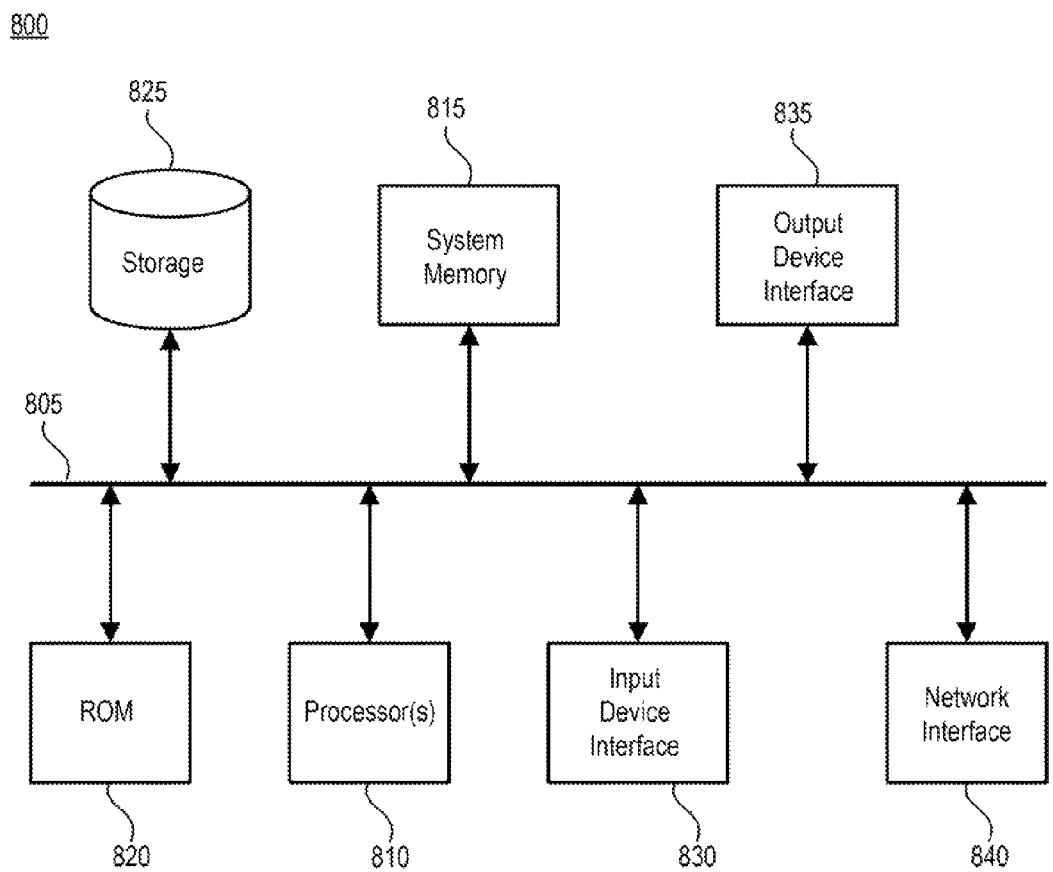
FIG. 8 conceptually illustrates an example electronic system with which some implementations of the subject technology are implemented.

FIG. 8 conceptually illustrates an electronic system 800 with which some implementations of the subject technology are implemented. For example, one or more of the client computing devices 310.1-2 or the web server 320 may be implemented using the arrangement of the electronic system 800. The electronic system 800 can be a computer (e.g., a mobile phone, PDA), or any other sort of electronic device. Such an electronic system includes various types of computer readable media and interfaces for various other types of computer readable media. Electronic system 800 includes a bus 805, processor(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processor(s) 810 with the read-only memory 820, the system memory 815, and the permanent storage device 825.

From these various memory units, the processor(s) 810 retrieves instructions to execute and data to process in order to execute the processes of the subject technology. The processor(s) can include a single processor or a multi-core processor in different implementations.

The read-only-memory (ROM) 820 stores static data and instructions that are needed by the processor(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (for example a magnetic or optical disk and its corresponding disk drive) as the permanent storage device 825.

Other implementations use a removable storage device (for example a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, or the read-only memory 820. For example, the various memory units include instructions for embedding a guest module within an embedder module in accordance with some implementations. From these various memory units, the processor(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, for example cathode ray tubes (CRT) or liquid crystal displays (LCD). Some implementations include devices for example a touch screen that functions as both input and output devices.

Finally, as shown in FIG. 8, bus 805 also couples electronic system 800 to a network (not shown) through a network interface 840. In this manner, the electronic system 800 can be a part of a network of computers (for example a local area network (LAN), a wide area network (WAN), or an Intranet, or a network of networks, for example the Internet. Any or all components of electronic system 800 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method, comprising:
   executing an embedder module at a computer;
   receiving, via the embedder module, a request to access a guest module, wherein the request comprises a tag in a programming language, and wherein the tag identifies the guest module;
   providing, using information associated with the tag, an event to an executing instance of the guest module responsive to the request to access the guest module;
   signaling for processing of the event at the executing instance of the guest module;
   providing the request to access the guest module from the embedder module to a broker module; and
   identifying, using the broker module, the guest module,
   wherein the broker module comprises a web browser, an operating system controller, a web browser application store, or an operating system application store.

2. The method of claim 1, further comprising:
   providing a visual interface associated with the guest module within a visual interface of the embedder module.

3. The method of claim 1, wherein the executing instance of the guest module executes at the computer.

4. The method of claim 1, wherein the executing instance of the guest module executes at a computing device different from the computer, and wherein the computing device and the computer are associated with a common user account.

5. The method of claim 4, wherein the common user account comprises a web browser user account or an operating system user account.

6. The method of claim 1, wherein either the embedder module or the guest module comprises a packaged application that is installed via a web browser, is stored externally to the web browser, and has access to extensions of the web browser.

7. The method of claim 1, wherein either the embedder module or the guest module comprises a browser application that is stored within a web browser.

8. The method of claim 1, wherein the tag specifies a version of the guest module to be accessed.

9. A non-transitory computer-readable medium comprising instructions which, when executed by a computer, cause the computer to implement a method, the method comprising:
   executing an embedder module at the computer;
   receiving, via the embedder module, a request to access a guest module, wherein the request comprises a tag in a programming language, and wherein the tag identifies the guest module;
   providing, using information associated with the tag, an event to an executing instance of the guest module responsive to the request to access the guest module,
   wherein the executing instance of the guest module executes at a computing device different from the computer, and wherein the computing device and the computer are associated with a common user account;
   signaling for processing of the event at the executing instance of the guest module;
   providing the request to access the guest module from the embedder module to a broker module; and
   identifying, using the broker module, the guest module,
   wherein the broker module comprises a web browser, an operating system controller, a web browser application store, or an operating system application store.

10. The non-transitory computer-readable medium of claim 9, the method further comprising:
    providing a visual interface associated with the guest module within a visual interface of the embedder module.

11. The non-transitory computer-readable medium of claim 9, wherein the common user account comprises a web browser user account or an operating system user account.

12. The non-transitory computer-readable medium of claim 9, wherein either the embedder module or the guest module comprises a packaged application that is installed via a web browser, is stored externally to the web browser, and has access to extensions of the web browser.

13. The non-transitory computer-readable medium of claim 9, wherein either the embedder module or the guest module comprises a browser application that is stored within a web browser.

14. The non-transitory computer-readable medium of claim 9, wherein the tag specifies a version of the guest module to be accessed.

15. A system, comprising:
one or more processors; and
a memory comprising instructions which, when executed by the one or more processors, cause the one or more processors to implement a method, the method comprising:
executing an embedder module;
receiving, via the embedder module, a request to access a guest module,
wherein the request comprises a tag in a programming language, wherein the tag identifies the guest module, wherein the guest module has multiple versions, and wherein the tag specifies a version of the guest module to be accessed;
providing, using information associated with the tag, an event to an executing instance of the guest module responsive to the request to access the guest module;
signaling for processing of the event at the executing instance of the guest module;
providing the request to access the guest module from the embedder module to a broker module; and
identifying, using the broker module, the guest module, wherein the broker module comprises a web browser, an operating system controller, a web browser application store, or an operating system application store.

16. The system of claim 15, the method further comprising: providing a visual interface associated with the guest module within a visual interface of the embedder module.

* * * * *